Sept. 29, 1942.  K. MEISSNER  2,297,425

EXHAUST CONDUIT ASSEMBLY

Filed Aug. 24, 1939

Inventor:
Kurt Meissner,
Bailey L Larson
Attorneys

Patented Sept. 29, 1942

2,297,425

UNITED STATES PATENT OFFICE 2,297,425

EXHAUST CONDUIT ASSEMBLY

Kurt Meissner, Dessau, Germany; vested in the Alien Property Custodian

Application August 24, 1939, Serial No. 291,793
In Germany September 2, 1938

2 Claims. (Cl. 60—35.6)

This invention is directed to the construction of exhaust stacks or conduits which have the form of recoil or reaction nozzles, by means of which the forces of recoil created by exhaust gases emitted from the conduits aid in the forward propulsion of an aircraft. The invention is more particularly directed to the assembly of a plurality of exhaust conduits into a compact bundle, and a cowling for coverng this bundle and for concealing flaming gases emitted from the conduits.

The outlet ends of exhaust stacks coming from the individual cylinders of an engine have been hitherto formed as reaction producing nozzles. The stacks projecting perpendicularly from the engine block to the engine cowling, have their outlet ends bent toward the rear of the engine and form reaction nozzles. Thus each nozzle lies adjacent its corresponding cylinder and communicates with the outside of the aircraft at that point. Because of the short length of the stacks, flaming gases are exhausted therefrom. The stacks, and especially the constricted nozzles thereof, become incandescent from the heat and pressure of the exhaust gases passing therethrough. Engine cowlings which partially cover the nozzle ends of the stacks decrease air resistance to some extent, but fail to cover the flaming exhaust gases emitted from the nozzles. For military purposes these exposed flames and the incandescent nozzles are very undesirable, as they enable the aircraft to be readily discovered at night.

An object of this invention is to arrange the reaction type exhaust conduits so that they can be completely covered by a cowling, and thus give less air resistance.

Another object of the invention is to arrange the reaction type exhaust conduits so that the exhaust gases emitted from the nozzle ends of the conduits are concealed from view except when seen from the rear of the engine, and at the same time to supply sufficient air to quench the flames as they are emitted from the nozzles.

Another object of the invention is to assemble the individual exhaust conduits so that the outlet ends of the nozzles lie in the same plane, which extends substantially normal to the aircraft covering and to conceal these ends.

Another object of the invention is to obtain a better heat exchange between the reaction type exhaust conduits and a cooling medium.

Generally these objects of the invention are obtained by extending the exhaust conduits of a cylinder-in-line internal combustion engine rearwardly of the engine so that a compact bundle of conduits is formed, the outlet ends of which have the form of reaction nozzles and terminate in the same plane. A single streamlined cowling covers this bundle of conduits and extends rearwardly of the ends of the reaction nozzles to form a chamber into which the flaming exhaust gases pass, and in which the flames are burnt out or quenched. Suitable brackets hold the conduits in slightly spaced relation so that cooling air admitted into the cowling can cool them. This cooling air is then used to aid in quenching the flaming gases at the nozzles, or is passed into the interior of the aircraft to be used for heating purposes. In the latter case, other openings are made in the cowling to obtain air to quench the flaming exhaust gases.

These and other objects of the invention are more fully understood with reference to the accompanying drawing, in which.

Figure 1:
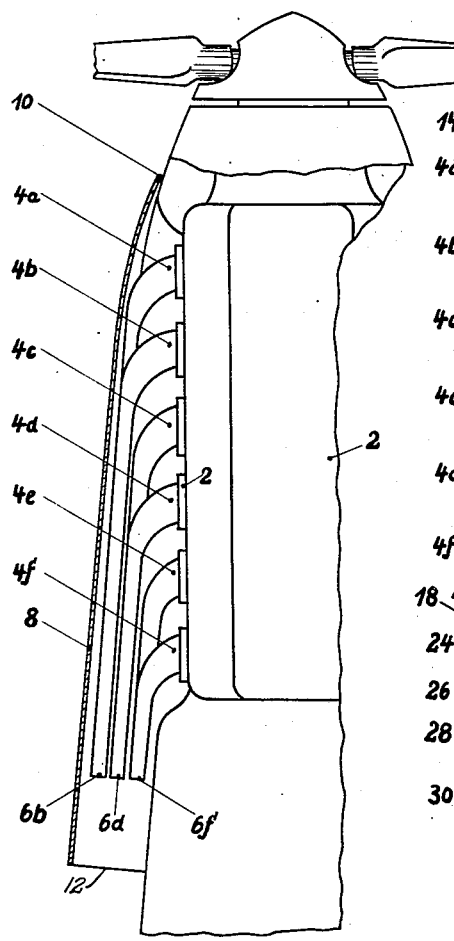
Fig. 1 is a top plan view, partly in section, of an engine nacelle, and showing the assembly of the exhaust conduits.

In Fig. 1, a cylinder-in-line internal combustion engine 2 is fitted with exhaust stacks 4a—4f, inclusive, there being one exhaust stack for each engine cylinder. Each stack 4a—4f is bent toward the rear of the engine and continued as an exhaust conduit to a point adjacent the rear end of engine 2, where the ends of the respective conduits are formed as reaction or recoil producing nozzles 6a—6f, respectively. The conduits therefore extend substantially parallel to each other and to engine 2, and terminate with their outlet ends lying in a plane which is substantially perpendicular to engine 2. The individual conduits in this compact group or bundle of assembled conduits are slightly spaced from each other so that cooling air may flow therebetween. Suitable brackets may be employed for spacing and reinforcing the conduits, and for supporting the conduits from the body of the engine, or the engine mounting. It is noted that the stacks 4a—4f are of circular section adjacent the engine 2, and are of flattened oval section in their conduit portions which lie parallel to each other. By thus flattening the conduits, a more compact bundle is obtained and a transition in shape occurs to produce the constricted nozzles 6a—6f, respectively.

Streamlined cowling 8 extends from a point forwardly of stack 4a to a point rearwardly of nozzles 6a—6f. The forward end or nose 10 of cowling 8 is spaced from the engine housing so that cooling air can pass between cowling 8 and engine 2. Optionally, an opening could be formed in the nose of the cowling for the admission of air. The air flows around and between the conduits and helps to quench the flames of and dissipate the exhaust gases emitted from nozzles 6a—6f. Rear end 12 of cowling 8 is positioned sufficiently beyond nozzles 6a—6f so that a chamber is formed between the cowling and aircraft covering in which the flaming exhaust gases are burnt out or extinguished before passing into the atmosphere.

By this use of the compact conduit bundle, an improved streamlining of the exhaust system is obtained as a single unbroken cowling covers the conduits, and the slightly increased frontal surface of the structure is more than offset by the advantages in streamlining obtained. Furthermore, the nozzle ends of the conduits, which become incandescent from the heat of the exhaust gases, and the flaming exhaust gases emitted from the nozzles, are effectively concealed from all views except from directly to the rear of end 12 of cowling 8. Such concealment is greatly desired for military purposes, and is obtained by the simple, lightweight, and economical use of the cowling described.

Figure 2:
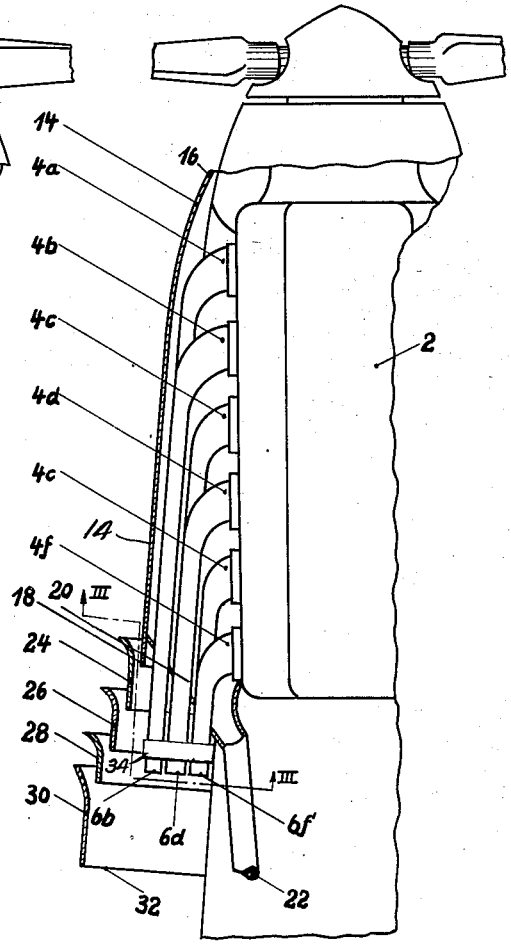
Fig. 2 is a similar view of a modified form of the invention.
Figure 3:
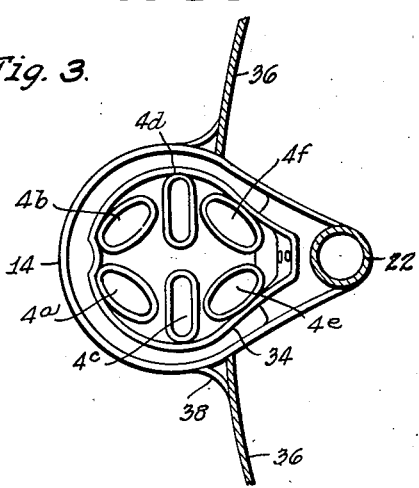
Fig. 3 is a cross-sectional view on the line III—III of Fig. 2.

In Figs. 2 and 3, another form of the invention is shown in which the cowling is modified so that the air used to cool the exhaust conduits can be conducted to the interior of the aircraft and used for heating purposes. The arrangement of the conduits into a compact bundle is similar to that illustrated in Fig. 1, with the additional showing in Fig. 3 of a bracket 34 for holding the conduits assembled.

Cowling 14 has its forward end 16 spaced from the engine housing in order to admit cooling air in between cowling 14 and engine 2. Rear end 18 of cowling 14, however, terminates short of the nozzle ends 6a—6f. Baffle 20 closes off the rear end of the space between the cowling and the engine, and directs the air which has flowed around the exhaust conduits, into pipe 22 which goes to the interior of the aircraft. The conduits, of course, penetrate baffle 20.

Air for extinguishing flaming exhaust gases emitted from nozzles 6a—6f is obtained by the use of arcuate cowling sections 24, 26, 28 and 30. Section 24 overlaps and is spaced from cowling 14 to allow the entrance of air between section 18 and the body of the aircraft behind baffle 20. Similarly section 26 overlaps and is spaced from section 24, and sections 28 and 30 are respectively lapped at d spaced from their preceding sections. Rear end 32 of section 30 terminates some distance rearwardly of nozzles 6a—6f to form a chamber into which the flaming exhaust gases are emitted.

The forward edge of each of the sections 24, 26, 28 and 30 may be flared outwardly as shown to form air scoops. Air enters beneath the sections in sufficiently abundant quantity to extinguish and dissipate the flaming exhaust gases within the chamber formed by the sections. Consequently the incandescent nozzle tips and the flaming gases are hidden from view except when seen from directly behind the engine. Sections 24, 26, 28 and 30 provide but little frontal resistance for the cowling, and thus the advantages described for Fig. 1 are again obtained in the construction of Fig. 2.

Although Fig. 3 is a section on the line III—III of Fig. 2, it illustrates the position of the conduits in the bundle, and the manner of joining the cowling of Fig. 1, as well as that of Fig. 2, to the aircraft covering. Conduits 4a—4f are held in place by a strap or bracket 34, sufficient space being left between the conduits for the free passage of cooling air. Cowling 14 extends from engine 2 through an opening in the covering 36 of the aircraft and seals the space containing the conduit bundle from the interior of the aircraft. Fillets 38 are inserted at the juncture of cowling 14 with covering 36 to complete the streamlined shape of the bulge on the surface of covering 36.

Figure 3A:
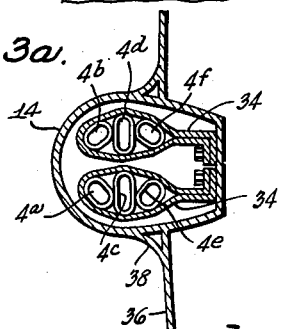
Fig. 3a is a cross-sectional view similar to Fig. 3 but illustrating a modified manner of securing the exhaust conduits in bundles.

In Figs. 1 and 2, the exhaust conduit bundle is formed from the six conduits corresponding to the six cylinders in engine 2. However, the conduits can be grouped into bundles each of which contains two or more conduits, as for example three conduits in each bundle as shown in Fig. 3a. Moreover, each bundle may be provided with a separate cowling. Furthermore, in the construction of Fig. 1, additional openings can be made in the cowling adjacent the nozzles 6a—6f for the more abundant supply of air to the chamber at the ends of the nozzles.

This invention produces the advantages in that the flames emitted from the reaction type nozzles are completely extinguished by an abundant supply of air, while being concealed from view. Likewise, the nozzles at incandescent heat are hidden, and the concealing structure does not appreciably increase the frontal resistance of the aircraft. At the same time, the exhaust conduits, which become highly heated in conduits employing reaction type nozzles, are adequately cooled, and the heated cooling air can be used for other purposes as for heating the interior of the aircraft.

Having now described the means by which the objects of this invention may be obtained, what I claim as new and desire to secure by Letters Patent is:

1. An exhaust system for an internal combustion engine of the cylinder-in-line type comprising an individual exhaust conduit extending from each cylinder and directed rearwardly of said engine and formed as a reaction nozzle, all of the conduits being arranged as a compact bundle with air passages between said conduits throughout substantially the entire length thereof, said conduits having their respective outlet ends terminating in substantially the same plane which extends transversely of the longitudinal axis of said engine, a streamline cowling covering said conduits and being extended beyond said ends to form a chamber into which gases are discharged from said conduits, and said cowling having an opening at the forward end thereof for the admission of cooling air to said conduits.

2. An exhaust system as in claim 1, said streamline cowling comprising, in part, a series of spaced and overlapping curved sections extending from a point forwardly of said ends to a point rearwardly of said ends whereby air is admitted to said chamber through the openings between said sections for quenching exhaust flames in said chamber.

KURT MEISSNER.